Oct. 21, 1958
C. A. BERRIDGE
2,857,343
SPONGEABLE POLYSILOXANE COMPOSITION AND PROCESS
OF PRODUCING SPONGE THEREFROM
Filed Nov. 1, 1956
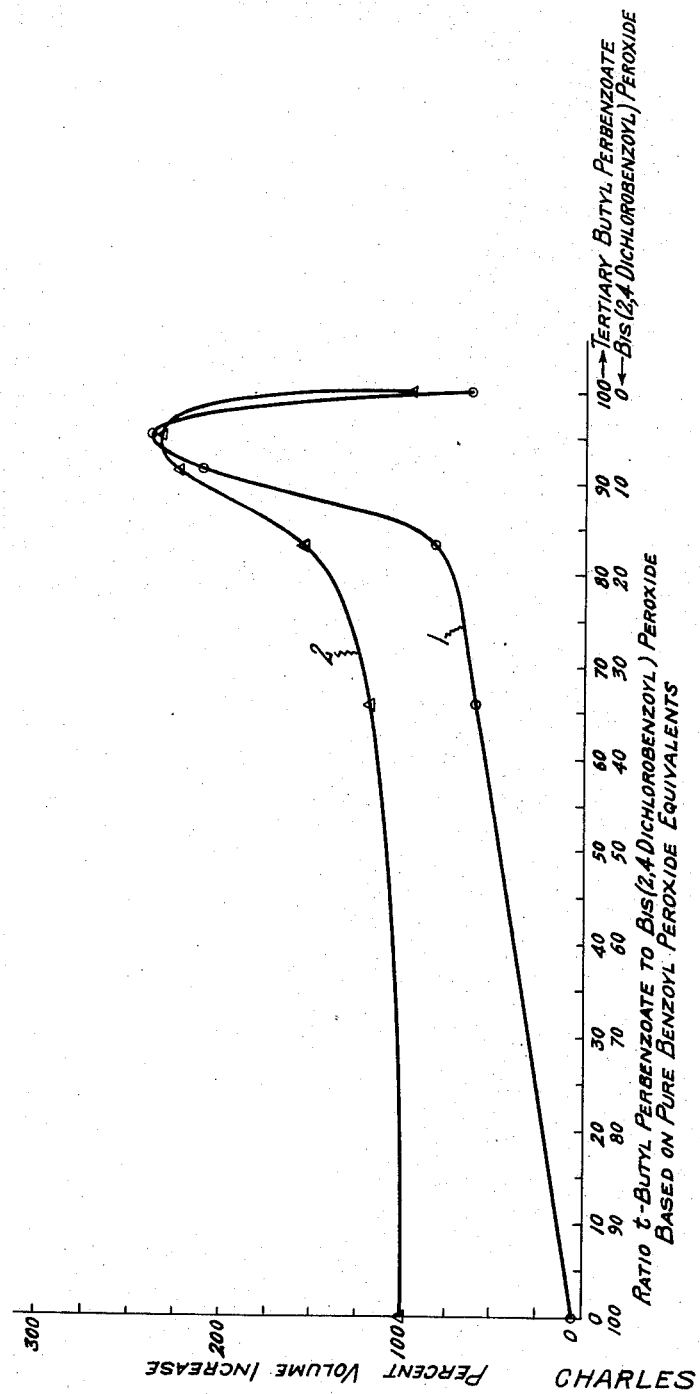
INVENTOR.
CHARLES A. BERRIDGE
BY
HIS ATTORNEY

United States Patent Office 2,857,343
Patented Oct. 21, 1958

2,857,343

SPONGEABLE POLYSILOXANE COMPOSITION AND PROCESS OF PRODUCING SPONGE THEREFROM

Charles A. Berridge, Cohoes, N. Y., assignor to General Electric Company, a corporation of New York Application November 1, 1956, Serial No. 619,847

7 Claims. (Cl. 260—2.5)

My invention relates to new and improved silicone rubber sponge and to the method of making thereof.

The production of sponge from filled silicone rubber compounds or organopolysiloxanes which are convertible by heat to the solid, elastic state has been known for some time. A primary consideration in the production of sponge silicone rubber is to obtain the maximum possible expansion or volume from a given volume of raw material and amount of blowing agent consistent with desirable physical characteristics. In addition to the blowing agent which releases an inert gas such as nitrogen, carbon-dioxide and the like to provide the actual expansion, curing catalysts or agents are generally utilized, such catalysts improving the strength and other qualities of the end product. Among the curing catalysts or agents in use are tertiary butyl perbenzoate, benzoyl peroxide, and bis(2,4-dichlorobenzoyl) peroxide. Among the blowing agents are dinitrosopentamethylenetetramine sold by Du Pont as Unicel ND and N,N'-dimethyl N,N'-dinitrosoterephthalamide sold by Du Pont as BL-353.

The principal object of this invention is to provide sponged silicone rubber having improved expansion or volume increase and desirable physical characteristics.

Briefly stated, my invention comprises an expandable or spongeable silicone rubber with particular ratios of two curing agents or catalysts along with a blowing agent to provide maximum expansion and a sponge of desirable strength.

Those features of the invention which are believed to be novel are set forth with particularity in the claims appended hereto. My invention will, however, be better understood and further objects made apparent from a consideration of the following description and the drawing in which the single figure shows a plot of the percent volume increase of a silicone sponge rubber compound versus the amounts of several curing agents used.

The silicone rubbers or my invention are prepared from convertible organopolysiloxanes and derivatives and modifications thereof which are well known in the art. They are described, for example, in Patents 2,448,756; 2,704,748; 2,541,137 and 2,460,895.

The convertible silicone compositions which may be highly viscous masses or gummy, elastic solids, depending on the state of condensation, the condensing agent employed, the starting organopolysiloxane used to make the convertible organopolysiloxane, etc., will hereinafter be referred to as "convertible organopolysiloxane" or, more specifically, as "convertible methylpolysiloxane." Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed in Agens Patent 2,448,756, issued September 7, 1948; or Sprung et al. Patent 2,448,556, issued September 7, 1948; Sprung Patent 2,484,595, issued October 11, 1949; Krieble et al. Patent 2,457,688, issued December 28, 1948; Hyde Patent 2,490,357, issued December 6, 1949; Marsden Patent 2,521,528, issued September 5, 1950; and Warrick Patent 2,541,137 issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals) connected to silicon atoms by carbon-silicon linkages, may be employed without departing from the scope of the invention.

The particular organopolysiloxane convertible to the cured, solid, elastic state used is not critical and may be any one of those described in the foregoing patents which are generally obtained by condensation of a liquid organopolysiloxane containing an average of from about 1.95, preferably from about 1.98, to about 2.05 organic groups per silicon atom. The usual condensing agents which may be employed and which are well known in the art may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, 2 mol percent copolymerized monoorganosiloxane, for example, copolymerized monomethylsiloxane. Generally, I prefer to use as the starting liquid organopolysiloxane from which the convertible, for example, heat-convertible organopolysiloxane is prepared, one which contains about 1.999 to 2.01, inclusive, organic groups, for example, methyl groups, per silicon atom and where more than about 90 percent, preferably 95 percent, of the silicon atoms in the polysiloxane contain two silicon-bonded alkyl groups.

Fillers used with the organic polysiloxane material include fumed silica (such as Cab-O-Sil produced by Godfrey L. Cabot Company), silica aerogel (e. g., Santocel produced by Monsanto Chemical Company), precipitated silica (e. g., Hi-Sil X303 made by Columbia-Southern Chemical Company) and diatomaceous earth (e. g., Celite Superfloss made by Johns-Manville), titanium dioxide, etc. Other fillers (such as those described in the above 2,541,137 patent) and pigments can be used to color or modify the final product as desired.

In general, I have found that superior expansion results when tertiary butyl perbenzoate curing agent and bis(2,4-dichlorobenzoyl) peroxide or benzoyl peroxide or mixtures of the latter two agents are used in such weight ratio that the tertiary butyl perbenzoate ranges from about 65% to 96% of the total weight of the curing agent and the bis(2,4-dichlorobenzoyl) peroxide or benzoyl peroxide or mixtures thereof constitutes from about 35% to 4% of the total amount of curing agent used. Preferably, the amounts of curing agents as above range respectively from about 94% to 96% and about 6% to 4%.

The following examples will illustrate typical embodiments of my invention and are not to be taken as limiting. All parts are by weight. In the examples the copolymer was prepared by mixing together about 95 mol percent octamethylcyclotetrasiloxane and about 5 mol percent octaphenylcyclotetrasiloxane at a temperature of from 150° C. to 175° C. for about four hours with about 0.01% potassium hydroxide based on the weight of the siloxane until a highly viscous, gummy solid was obtained. The amount of octaphenylcyclotetrasiloxane can be varied up to 20 mol percent of the total mixture for the purpose of this invention.

A material comprising 100 parts of the copolymer, 30 parts precipitated silica, 2 parts diphenylsilanediol and 5 parts of finely divided titanium dioxide were compounded on a rubber mill. There were mixed with the above material curing agents and a blowing agent as shown in the table below, the curing agent being in parts, by weight, and the blowing agent in percent, by weight, based on the weight of the filled copolymer plus curing agent.

*Table I*

| Example | 1 | 2 | 3 |
|---|---|---|---|
| Parts TBP [1]/100 parts copolymer | 2.7 | 2.0 | 1.9 |
| Parts BPO [1]/100 parts copolymer | 0 | 0 | 0.5 |
| Percent blowing agent BL-353 [2] | 2 | 2 | 2 |
| Expansion at 250° C. cure | 125 | 110 | 160 |

[1] TBP—Tertiary butyl perbenzoate. BPO—Benzoyl peroxide.
[2] Based on the weight of filled copolymer plus curing agent.

When the above examples were free blown by heating to 250° C., the percent increases in volume or expansion obtained were as shown in Table I. It will be noted at once that when tertiary butyl perbenzoate was used alone, the expansion was substantially less than when it was used in conjunction with benzoyl peroxide. Similar results are obtained when the filler is added in the examples in the doughmixer.

A material comprising 100 parts of the above copolymer, 43 parts precipitated silica treated with octamethylcyclotetrasiloxane, 2 parts of diphenylsilanediol, and 15 parts titanium dioxide were compounded on a rubber mill. There were mixed with the above material curing agents as shown in Table II below:

*Table II*

| Example | 4 | 5 | 6 | 7 | 8 | 9 | 10 |
|---|---|---|---|---|---|---|---|
| Parts TBP/100 parts copolymer | 1.6 | 2.3 | 2.7 | 2.9 | 2.7 | 0 | 3.5 |
| Parts Bis(2,4-di-chlorobenzoyl) peroxide/100 parts copolymer | 1.6 | 0.96 | 0.52 | 0.32 | 0 | 2.2 | 0 |
| Parts BPO/100 parts copolymer | 0 | 0 | 0 | 0 | 0.5 | 0 | 0 |
| Percent expansion at 170° C. | 85 | 100 | 210 | 240 | [1] 170 | [1] 10 | [1] 60 |

[1] Cured and free blown at 250° C. Experiments show that expansions at 250° C. are equal to or better than at 170° C.

When the above examples were free blown by heating to 170° C., the percent expansions obtained were as shown in Table II. It will be noted that with only one of the curing agents, either of the perbenzoate type or of the benzoyl peroxide type, the percent expansion was again substantially less than when the two were used in combination.

A material comprising 97 parts of the above copolymer, 35 parts of finely divided silica, 10 parts titanium dioxide and 3 parts diphenylsilanediol were compounded on a rubber mill and doughmixed for at least one hour at 135° C. to 150° C. in accordance with my copending application Serial No. 619,848 assigned to the same assignee as this application. Then 5 parts diatomaceous earth were mixed therewith along with curing agents and blowing agent as shown in Example 16 of Table III suffixed.

A material similar to that immediately preceding except that the titanium dioxide was omitted was prepared similarly and curing agents and blowing agent mixed therewith as shown in Examples 11 through 15 of Table III.

*Table III*

| Example | 11 | 12 | 13 | 14 | 15 | 16 |
|---|---|---|---|---|---|---|
| Parts TBP/100 parts copolymer | 3 | 2.9 | 2.7 | 2.3 | 1.6 | 0 |
| Parts Bis(2,4-dichlorobenzoyl) peroxide/100 parts copolymer | 0 | 0.32 | 0.52 | 0.96 | 1.6 | 3.2 |
| Percent blowing agent BL-353 | 2 | 2 | 2 | 2 | 2 | 2 |
| Percent expansion at 150° C. | 88 | 235 | 225 | 155 | 120 | 100 |

When the above materials were catalyzed and free blown at 150° C., the percent expansions obtained were as shown above in Table III. Again, it will be noted that superior results were obtained when the curing catalysts were used in specific ratios and not alone.

Shown in the drawing in curve 1 is a graphical representation of the percent expansion versus relative percentages of tertiary butyl perbenzoate and bis(2,4-dichlorobenzoyl) peroxide (both being converted to equivalents in terms of benzoyl peroxide) or benzoyl peroxide itself for the materials shown in Examples 4 to 10. It will be noted from curve 1 that at ratios of t-butyl perbenzoate from about 65% up to about 96% of the total curing catalyst the percent expansion of the material increases substantially. With one or the other of the catalysts alone, that is, perbenzoate or peroxide, the expansion is relatively poor.

Shown in the drawing in curve 2 is a graphical representation similar to that of curve 1 for the materials of Examples 11 through 16. Again it will be noted that the percent expansion of the material begins to increase rapidly when the t-butyl perbenzoate constitutes about 65% of the catalyst combination and this trend continues until this curing catalyst constitutes about 96% of the total catalyst combination. Again with only one of the catalysts the percent expansion is relatively low.

The same copolymer material as in Examples 11 through 15 was treated with curing agents as shown below and with 6 percent and 4 percent Unicel ND (dinitrosopentamethylenetetramine) as a blowing agent, with the results shown in Table IV below. (The percent expansions for the 4% of blowing agent are shown in parentheses.)

*Table IV*

| Example | 17 | 18 | 19 |
|---|---|---|---|
| Parts TBP/148 parts copolymer | 3.0 | 1.6 | 2.7 |
| Parts Bis(2,4-dichlorobenzoyl) peroxide/148 parts copolymer | | 1.6 | 0.52 |
| Percent blowing agent—Unicel ND | 6 (4) | 6 (4) | 6 (4) |
| Percent expansion at 250° C. | 260 (111) | 195 (88) | 285 (121) |

The sponge obtained using Unicel ND was of the same general strength and quality as when using BL-353 as the blowing agent.

The expanded silicone rubbers of my invention are characterized by good skin strength, tensile strength and other physical characteristics. Compression-deflection tests were performed according to ASTM-D-1056-54T on test specimens prepared from mold-expanded sheets of material having 185-200 percent increase in volume. Examples 20 and 21 were prepared from the material of Example 6 and Examples 22 and 23 from the material of Example 13. The specimens were press molded for 10 minutes at 150° C. with oven curing as indicated in Table V below. The force in pounds given is that needed to compress the specimen to the indicated percentage of its original thickness (To).

*Table V*

| Oven Cure | Unit Load (lbs.) to Compress to 75% To (p. s. i.) | | Unit Load (lbs.) to Compress to 75% To (p. s. i.) | |
|---|---|---|---|---|
| | Example 20 | Example 21 | Example 22 | Example 23 |
| None | 5 | 10 | 15 | 28 |
| 20 hours at 150° C | 8 | 13 | 17 | 34 |
| 4 hours at 250° C | 6 | 13 | 16 | 37 |
| 24 hours at 250° C | 8 | 18 | 19 | 43 |
| 14 days at 177° C | 13 | (*) | 28 | (*) |

*Test not run.

The compression set of the expanded materials of this invention is also very satisfactory. When the materials of Example 6 mold expanded to 180–210 percent increase in volume and Example 13 mold expanded to 160–175 percent increase in volume and tested according to ASTM–D–1056–51T, the results were as shown in Table VI below. Examples 24, 26 and 28 relate to material of Example 6 treated as below and Examples 25, 27 and 29 relate to material of Example 13 so treated. The material was in each case molded in a mold in the form of flat sponge sheets for 10 minutes at 150° C. and given an additional oven cure as indicated. For the actual compression test, disks are cut from the molded and heat-treated sheets, the disks being superposed one on the other until a cylinder one-half inch high is obtained. This cylinder or plug is then compressed to 50% of its thickness between steel plates for 22 hours at the indicated temperature, cooled to room temperature and the pressure released. The thickness of the resulting plug is measured thirty minutes thereafter, this figure being taken as a measure of the compression set. A 100% compression set indicates no recovery while 0% compression set indicates that the plug returned to its original thickness after release of the pressure.

Table VI

| Oven Cure | 30° C. | | 100° C. | | 177° C. | |
|---|---|---|---|---|---|---|
| | Ex. 24 | Ex. 25 | Ex. 26 | Ex. 27 | Ex. 28 | Ex. 29 |
| None | 10 | 2 | 55 | 70 | 100+ | 100+ |
| 20 hours at 150° C | 3 | 1 | 10 | 30 | 100+ | 100+ |
| 4 hours at 204° C | 15 | 4 | 20 | 50 | 100+ | 100+ |
| 24 hours at 250° C | 1 | 2 | 7 | 5 | 30 | 25 |
| 14 days at 177° C | 4 | (*) | 8 | (*) | (*) | (*) |

*No data taken.

The thermal conductivity of the expanded material is also good. The material of Examples 11 through 16 under a contact pressure of one pound per square inch with a hot side temperature of 140° F. had at an expansion of 305% a thermal conductivity of $$0.59 \frac{B. t. u.\text{-inch}}{hr. ft.^{-2}°F.}$$

At an expansion of 625%, the thermal conductivity was $$0.43 \frac{B. t. u.\text{-inch}}{hr. ft.^{-2}°F.}$$

It will be seen that by my invention I have provided rubber silicone sponge which, by reason of a specific combination of curing catalysts and blowing agents, is characterized by improved expansion and desirable physical characteristics.

It will be realized, of course, that the fillers and blowing agents may be varied to produce sponges of various physical characteristics, the examples above being typical of those which may be obtained. For example, the blowing agent can be varied from about 2% to 6% based on the weight of the filled copolymer plus curing agent to produce sponge of various volume increases. The total amount of curing agent can be varied from 2 parts to 4 parts per 100 parts of filled copolymer material and the fillers, as well as the diphenylsilanediol content, can be altered to provide compositions of different desired physical characteristics. Thus, for example, materials such as that of Example 11 may have from 30 to 55 parts of finely divided silica, from 2 to 4 parts of diphenylsilanediol, from 0 to 20 parts of diatomaceous earth, and from 0 to 10 parts of titanium dioxide. Other examples can be varied in like manner to produce products of varying characteristics as desired.

What I claim as new and desire to secure by Letters Patent of the United States is:

1. A spongeable composition comprising a convertible organopolysiloxane containing from about 1.98 to 2.05 organic groups per silicon atom, at least 80% of said organic groups being methyl groups, any other organic groups present in the aforesaid organopolysiloxane being selected from the class consisting of other lower alkyl groups, aryl groups, halogenated aryl groups and mixtures thereof, said organopolysiloxane containing silica filler and containing as a curing agent from about 2% to 4%, by weight, based on the filled organopolysiloxane material, of a mixture of from about 65% to 96%, by weight, of tertiary butyl perbenzoate and about 35% to 4%, by weight, of a material selected from the group consisting of benzoyl peroxide, and bis-(2,4-dichlorobenzoyl) peroxide and mixtures thereof and containing from about 2% to 6%, by weight, based on the weight of the filled organopolysiloxane plus curing agent, of a blowing agent selected from the group consisting of dinitrosopentamethylenetetramine and N,N'-dimethyl N,N'-dinitrosoterephthalamide.

2. A spongeable composition comprising a convertible organopolysiloxane containing from about 1.98 to 2.05 organic groups per silicon atom, at least 80% of said organic groups being methyl groups, any other organic groups present in the aforesaid organopolysiloxane being selected from the class consisting of other lower alkyl groups, aryl groups, halogenated aryl groups and mixtures thereof, said organopolysiloxane containing silica filler and containing as a curing agent from about 2% to 4%, by weight, based on the filled organopolysiloxane material, of a mixture of about 95%, by weight, of tertiary butyl perbenzoate and about 5%, by weight, of a material selected from the group consisting of benzoyl peroxide, bis-(2,4-dichlorobenzoyl) peroxide and mixtures thereof and from about 2% to 6%, by weight, based on the weight of the filled organopolysiloxane plus curing agent of blowing agent consisting of dinitrosopentamethylenetetramine.

3. A spongeable composition comprising a convertible organopolysiloxane containing from about 1.98 to 2.05 organic groups per silicon atom, at least 80% of said organic groups being methyl groups, any other organic groups present in the aforesaid organopolysiloxane being selected from the class consisting of other lower alkyl groups, aryl groups, halogenated aryl groups and mixtures thereof, said organopolysiloxane containing silica filler and containing as a curing agent from about 2% to 4%, by weight, based on the filled organopolysiloxane material, of a mixture of about 95%, by weight, of tertiary butyl perbenzoate and about 5%, by weight, of a material selected from the group consisting of benzoyl peroxide, bis-(2,4-dichlorobenzoyl) peroxide and mixtures thereof and from about 2% to 6%, by weight, based on the weight of the filled organopolysiloxane plus curing agent, of a blowing agent consisting of N,N'-dimethyl N,N'-dinitrosoterephthalamide.

4. A spongeable composition comprising a convertible organopolysiloxane containing from about 1.98 to 2.05 organic groups per silicon atom, at least 80% of said organic groups being methyl groups, any other organic groups present in the aforesaid organopolysiloxane being selected from the class consisting of other lower alkyl groups, aryl groups, halogenated aryl groups and mixtures thereof, said organopolysiloxane containing silica filler and containing as a curing agent from about 2% to 4%, by weight, based on the filled organopolysiloxane material of a mixture of about 95%, by weight, of tertiary butyl perbenzoate and about 5%, by weight, of a material selected from the group consisting of benzoyl peroxide, bis-(2,4-dichlorobenzoyl) peroxide and mixtures thereof and containing as a blowing agent from about 2% to 6%, by weight, based on the filled organopolysiloxane plus curing agent, of a material selected from the group consisting of dinitrosopentamethylenetetramine and N,N'-dimethyl N,N'-dinitrosoterephthalamide.

5. The process of producing an organopolysiloxane sponge characterized by an enhanced volume increase and desirable physical characteristics which comprises adding to a convertible organopolysiloxane containing from about 1.98 to 2.05 organic groups per silicon atom, at least 80% of said organic groups being methyl groups, any other organic groups present in the aforesaid organopolysiloxane being selected from the class consisting of other lower alkyl groups, aryl groups, halogenated aryl groups, and mixtures thereof, said organopolysiloxane containing silica filler, and containing as a curing agent from 2% to 4%, by weight, based on the filled organopolysiloxane of a mixture comprising from about 65% to 90%, by weight, of tertiary butyl perbenzoate and from 35% to 4%, by weight, of a material selected from the group consisting of benzoyl peroxide, bis-(2,4-dichlorobenzoyl) peroxide and mixtures thereof and from 2% to 6%, by weight, based on the weight of the filled organopolysiloxane plus curing agent, of a blowing agent selected from the group consisting of dinitrosopentamethylenetetramine and N,N'-dimethyl N,N'-dinitrosoterephthalamide, and heating said mixture to expand and cure said organopolysiloxane.

6. The process of producing an organopolysiloxane sponge characterized by enhanced volume increase which comprises adding a silica filled convertible organopolysiloxane containing from about 1.98 to 2.05 organic groups per silicon atom, at least 80% of said organic groups being methyl groups, any other organic groups present in the aforesaid organopolysiloxane being selected from the class consisting of other lower alkyl groups, aryl groups, halogenated aryl groups and mixtures thereof, a curing agent, comprising a mixture of from about 2% to 4%, by weight, based on the filled organopolysiloxane material, from about 65% to 96% of tertiary butyl perbenzoate and from 35% to 4% of a material selected from the group consisting of benzoyl peroxide, bis-(2,4-dichlorobenzoyl) peroxide and from about 2% to 6%, by weight, based on the weight of the filled organopolysiloxane plus curing agent, of a blowing agent consisting of dinitrosopentamethylenetetramine and heating said mixture to expand and cure said organopolysiloxane.

7. The process of producing an organopolysiloxane sponge characterized by enhanced volume increase which comprises adding to a silica filled organopolysiloxane containing from about 1.98 to 2.05 organic groups per silicon atom, at least 80% of said organic groups being methyl groups, any other organic groups present in the aforesaid organopolysiloxane being selected from the group consisting of other lower alkyl groups, aryl groups, halogenated aryl groups and mixtures thereof, from 2% to 4%, by weight, based on the filled organopolysiloxane material, of a mixture of from about 65% to 96%, by weight, of tertiary butyl perbenzoate and about 35% to 4%, by weight, of a material selected from the group consisting of benzoyl peroxide, bis-(2,4-dichlorobenzoyl) peroxide and mixtures thereof and from about 2% to 6%, by weight, based on the weight of the filled organopolysiloxane plus curing agent of a blowing agent consisting of N,N'-dimethyl N,N'-dinitrosoterephthalamide and heating said mixture to expand and cure said organopolysiloxane.

References Cited in the file of this patent

UNITED STATES PATENTS

| | | |
|---|---|---|
| 2,568,672 | Warrick | Sept. 18, 1951 |
| 2,655,485 | Hoffman | Oct. 13, 1953 |
| 2,757,423 | Wurtz et al. | Aug. 7, 1956 |